United States Patent [19]

Bignell

[11] Patent Number: 5,792,965
[45] Date of Patent: Aug. 11, 1998

[54] MODE SUPPRESSION IN FLUID METER CONDUITS

[75] Inventor: Noel Bignell, Annandale, Australia

[73] Assignees: Commonwealth Scientific and Industrial Research Organisation; AGL Consultancy Pty. Ltd., both of Australia

[21] Appl. No.: 513,924

[22] PCT Filed: Mar. 7, 1994

[86] PCT No.: PCT/AU94/00104

§ 371 Date: Oct. 27, 1995

§ 102(e) Date: Oct. 27, 1995

[87] PCT Pub. No.: WO94/20821

PCT Pub. Date: Sep. 15, 1997

[30] Foreign Application Priority Data

Mar. 9, 1993 [AU] Australia ................ PL7726

[51] Int. Cl.$^6$ ................................................ G01F 1/66
[52] U.S. Cl. ............................................... 73/861.28
[58] Field of Search ........................... 73/861.28, 861.29, 73/861.31, 861.27

[56] References Cited

U.S. PATENT DOCUMENTS

| | | | |
|---|---|---|---|
| 4,003,252 | 1/1977 | Dewath | 73/861.27 |
| 4,164,865 | 8/1979 | Hall et al. | 73/861.28 |
| 4,445,389 | 5/1984 | Potzick et al. | 73/861.27 |
| 5,383,369 | 1/1995 | Khuri-Yakub | 73/861.29 |

FOREIGN PATENT DOCUMENTS

| | | |
|---|---|---|
| 82109976.9 | 10/1982 | European Pat. Off. . |
| 82109977.7 | 10/1982 | European Pat. Off. . |
| 85200070.2 | 1/1985 | European Pat. Off. . |
| 87104390.7 | 3/1987 | European Pat. Off. . |
| 90124417.8 | 12/1990 | European Pat. Off. . |
| 92203063.0 | 10/1992 | European Pat. Off. . |
| PCT/NL85/ 00041 | 10/1985 | WIPO . |
| WO93/05570 | 1/1993 | WIPO . |
| WO94/04890 | 3/1994 | WIPO . |

OTHER PUBLICATIONS

International Search report mailed 6 Jul. 1994.

*Primary Examiner*—Ronald L. Biegel
*Attorney, Agent, or Firm*—Dressler, Rockey, Milnamow & Katz, Ltd.

[57] ABSTRACT

The present invention relates to a fluid flow arrangement where the effects of high order acoustic modes are suppressed in ultrasonic flow measurement. In one embodiment, ultrasonic transducers are arranged in a duct configured to carry a fluid. Ultrasonic signals between the transducers travel in a plurality of high order modes having velocities slower than a fundamental mode whose time of flight is desired to determine with accuracy. A measurement portion between the transducers is adapted to suppress the propagation of the non-fundamental modes.

20 Claims, 15 Drawing Sheets

(0,1)

(0,2)

(0,3)

(1,1)

(1,2)

(1,3)

(2,1)

(2,2)

(2,3)

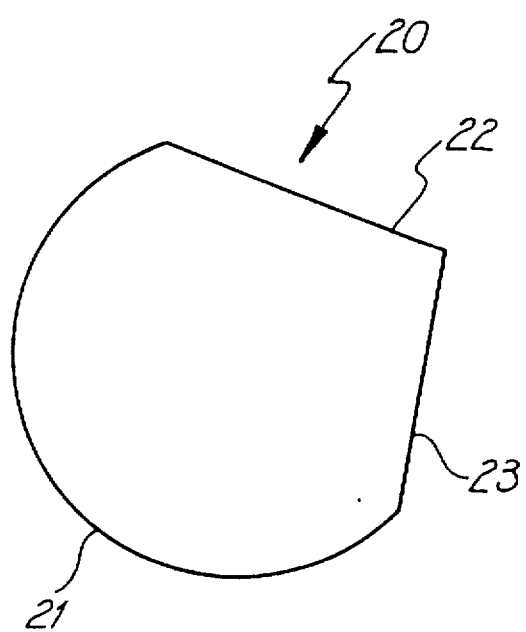
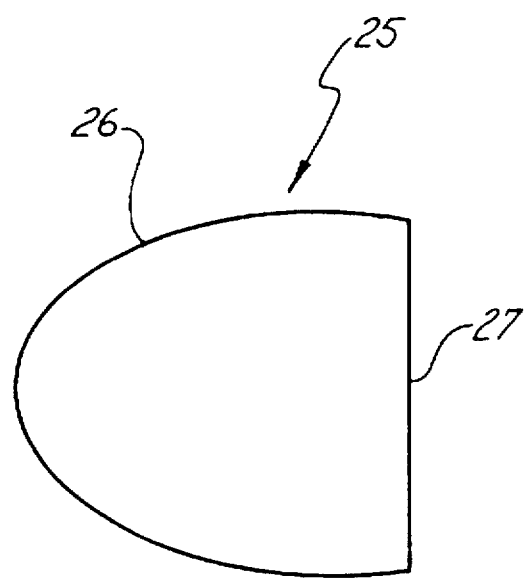
FIG. 15A
FIG. 15B

MODE SUPPRESSION IN FLUID METER CONDUITS

FIELD OF THE INVENTION

The present invention relates generally to ultrasonic flow measurements of fluids and, in particular, to the controlling and/or suppression of the effects, on the measurements, of non-fundamental acoustic modes.

BACKGROUND ART

It is known that the velocity of the flow of a gas as well as the velocity of sound in the gas can be determined by the taking of two measurements of the transit time of a pulse of ultrasound, one upstream and one downstream in the flowing stream. This is the principle of operation of a transit time ultrasonic gas meter. In order to perform this timing with small uncertainty, it is necessary to select some precise feature of the pulse which can serve as a timing marker. The crossing of the signal through zero is capable of very accurate location in time and makes a good timing marker. There are, however, a number of zero-crossings from which one such crossing must be reliably selected as the timing marker.

FIG. 1E shows a typical ultrasonic measurement arrangement 1 in which two transducers 2,3 face each other through a duct 4 having a cylindrical shape and circular cross-section with gas flowing in the direction indicated by the arrow 6.

FIGS. 1A–1D show a signal typically received from a pulse of ultrasound launched into the circular duct 4. The received signal is initially shown in FIG. 1A and extends for some time shown in FIGS. 1B, 1C and 1D where markers indicate times, 2 times, 3 times and 4 times respectively past the initial arrival of the start of the signal.

A particular negative going zero-crossing has been chosen as the event on which to do the timing. International Patent Application No. PCT/AU92/00314 (WO 93/00569) discloses an electronic fluid flow meter which incorporates circuitry developed which select this particular crossing in a two-stage process. Using the signal amplitude, a time is chosen before the arrival of the required crossing at which a negative-going zero-crossing detector is enabled. There is a reasonable latitude allowable in the timing for this preliminary event but it is apparent that it must occur before the chosen zero-crossing but after the preceding one. Otherwise, it would be used instead for the precise timing marker.

Such an arrangement has been found to operate satisfactorily. As it is based on the amplitude of the signal and how it varies with time, anything which changes the amplitude of the signal has the potential to interfere with the choice of the initial time and thus in the selection of the correct zero-crossing. One cause of amplitude changes in electronic systems are gain changes. These can be due to aging, temperature, or other environmental effects. It is normal to compensate for such changes by some form of automatic gain control (AGC) which almost eliminates these amplitude changes. There are, however, other causes of amplitude change that affect the individual peak heights in the signal even when, as a result of the AGC, the maximum peak height is constant. Furthermore, when amplitude changes cause an incorrect choice of zero-crossing the timing error which results will be at least one whole period of the signal. This represents a serious error because it is systematic and averaging will not produce an unbiased mean of smaller uncertainty. A significant contributor to these amplitude changes is the existence and propagation of, non-fundamental acoustic modes.

SUMMARY OF THE INVENTION

It is an object of the present invention to substantially overcome, or ameliorate, the abovementioned problems through provision of a means by which the effects of non-fundamental acoustic modes on the received signal, typically the amplitude thereof, can be further reduced.

Throughout the specification reference to "non-fundamental acoustic modes" is to be taken as including a reference to higher order acoustic modes, and vice versa.

In accordance with one aspect of the present invention there is disclosed a fluid flow measurement system comprising a duct for carrying a fluid, the duct having two transducers spaced apart therein to define a fluid flow measurement portion therebetween, wherein the measurement portion is adapted to control effects of non-fundamental acoustic modes on a signal received by at least one of the transducers.

Generally, the measurement portion is configured to control the propagation between the transducers of the non-fundamental acoustic modes, in order to reduce their effect as received by the transducer(s), in which the propagation is suppressed by decreasing the speed with which the non-fundamental acoustic modes travel or by modifying the phase relationships between them.

Advantageously, the speed of the fundamental acoustic mode is not decreased, and the effects of the non-fundamental acoustic modes is reduced by decreasing their net contribution upon a signal amplitude received by the one transducer.

In one form, the portion has at least one obstruction located in the duct whereby fluid in the duct can flow thereabout, the obstruction having a shape and being so located within the duct to suppress effects of the non-fundamental acoustic modes. Generally, the obstruction is positioned centrally within the duct. Alternatively, the obstruction(s) can be disposed non-centrally within the duct. Advantageously, the obstruction(s) is fluid dynamically shaped to reduce and ideally minimise a decrease in fluid pressure thereabout. Generally, this is achieved by locating an appropriate fluid dynamically shaped obstruction(s) having a substantially smooth surface within the measurement portion of the duct so as to minimise or substantially reduce fluid pressure drop within the duct.

In a particular form, at least a portion of the measurement portion itself is shaped to have an augmented, non-circular cross-section. Typically this is achieved by the duct having at least two wall portions interconnecting wherein one of the wall portions is curved and the other is substantially non-curved. The curved wall portion may be a partial ellipse, circle, parabola, hyperbola, cycloid, hypocycloid, or an epicycloid. The interconnection between the portions may be integrally formed, or formed from separate substrates. The obstruction, as indicated above, is located within the augmented measurement portion.

In one typical fluid flow measurement system there is a duct for carrying a fluid and having therein two transducers spaced apart to define a measurement portion therebetween, the measurement portion comprising a cylindrical duct and at least one fluid dynamically shaped obstruction located centrally therein.

Alternatively, the measurement portion can include at least a portion of the measurement portion having a shape which is non-circular in cross-section in combination with at least one fluid dynamically shaped obstruction disposed in the measurement portion, the combination being adapted to suppress effects of non-fundamental acoustic modes received by at least one of the transducers.

Generally, the obstruction is an ellipsoid and disposed between the transducers centrally in the duct along its principal axis, thereby resulting in the cross-section being annular about the obstruction and wherein the width of the flow passage between the duct walls and the obstruction varies along the obstruction.

There may be one, two, three up to ten or more obstructions disposed in the duct. The inner surface of the duct forming the measurement portion can also be roughened to suppress effects of non-fundamental acoustic modes received by at least one of the transducers.

A system in accordance wth the above can be used to take fluid flow measurements for either liquids or gases. Generally, the gas can be domestic gas, methane, propane, oxygen, hydrogen or industrially useful gases. Advantageously, the system can be configured as part of a domestic or industrial gas meter specifically adapted for measuring the flow of so-called "natural gas". Applications for liquid flow measurement include liquid hydrocarbon and water metering, as well as a ships' log.

BRIEF DESCRIPTION OF THE DRAWINGS

A number of embodiments of the present invention will now be described with reference to the drawings in which:

FIGS. 15A and 15B illustrate two tube shapes representing further embodiments which reduce the effects of high order modes resulting from the use of the ring-around technique;

BEST AND OTHER MODES FOR CARRYING OUT THE INVENTION

When a pulse of sound is launched down a tube or duct, it excites a number of acoustic modes that carry the signal. The modes may simply be thought of as reflections from the wall of the tube or may be considered as the vibrations of the stretched skin of a drum but propagated through space. Both of these analogies have their uses but each is limited.

The reflection analogy enables the determination that the velocity of propagation along the tube of the modes which are reflected more times, will be slower. The fastest mode is the plane wave or fundamental mode, which is not reflected. The plane wave mode propagates along the tube with the speed of sound in free space, denoted by c. The other modes, because of their reflection(s) from the tube wall, propagate along the tube at a wide range of velocities from almost c down to zero, though strictly speaking, a mode with zero velocity does not propagate. In general the slower modes are less excited, and therefore have smaller amplitudes, than the faster modes. For modes having propagation velocities less than c/5, the amplitude generally becomes only one or two percent of the main amplitude. Each mode except for the plane wave has a cut-off frequency below which it will not propagate in that particular duct. For the frequency and duct size involved, there are very many modes above cut-off.

Whilst the modes are separate entities, they superimpose to give an almost continuous signal. Some modes are more strongly received than others and so the total signal has a lumpy appearance, as shown in FIGS. 1A–1D, from which it will be seen that there are modes that are considerably larger than the modes of similar velocity on either side.

Figure 1A:
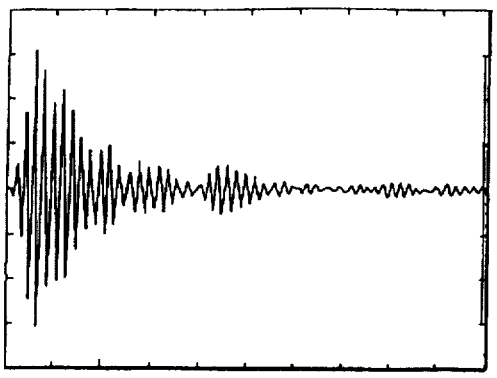
FIGS. 1A to 1D depict the reception of an acoustic pulse in the arrangement of FIG. 1E.
Figure 1B:
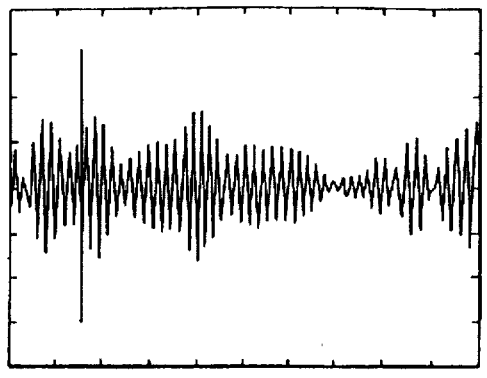
Figure 1C:
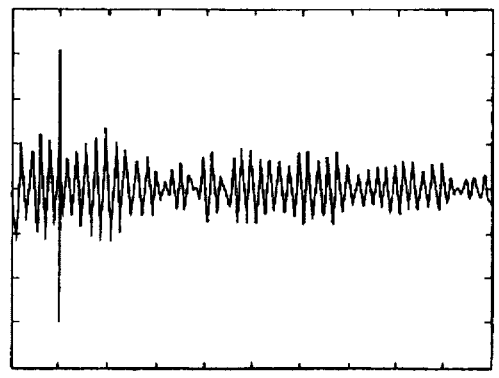
Figure 1D:
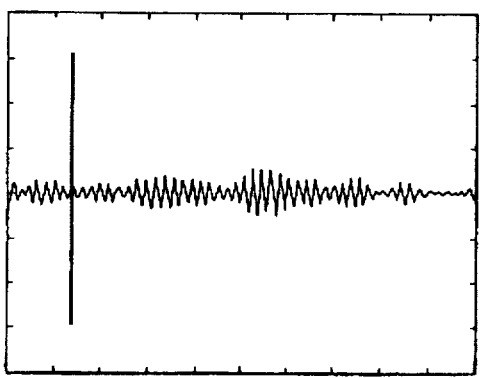
Figure 1E:
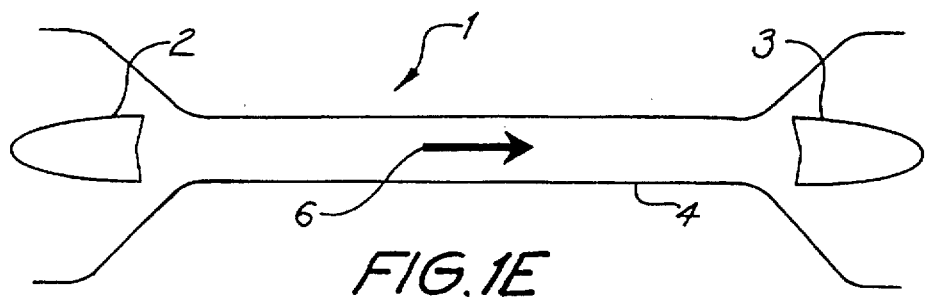
Figure 2:
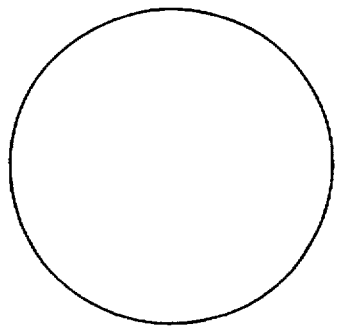
FIG. 2 depicts the fundamental (0,1) and various high order acoustic modes present in a circular duct of FIG. 1E.
Figure 2:
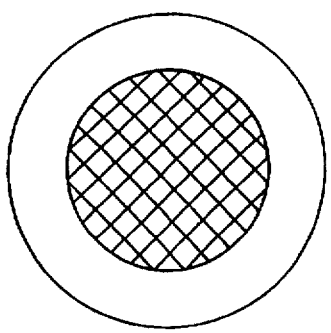
Figure 2:
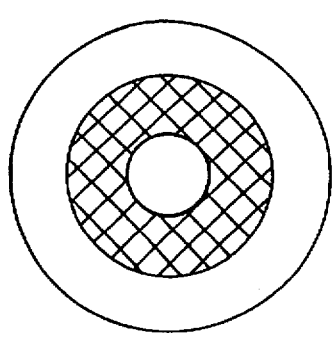
Figure 2:
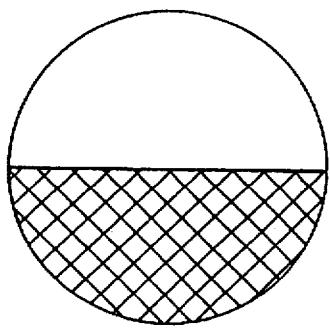
Figure 2:
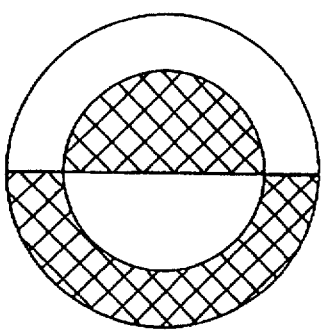
Figure 2:
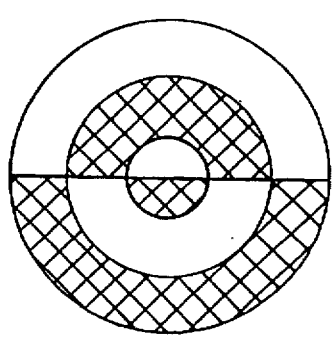
Figure 2:
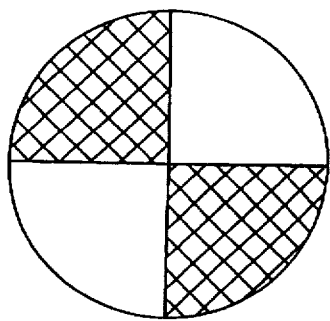
Figure 2:
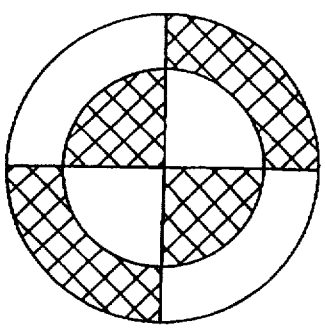
Figure 2:
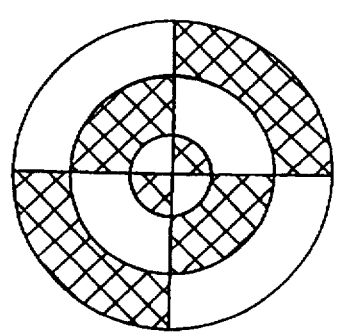

FIG. 2 shows a number of representations, using the drum head analogy, of some of the faster modes present in the circular duct 4. The (0,2) mode is a vibration of the central portion out of phase with the perimeter. This is expected because the transducers 2,3 act in the central part of the duct 4 where they cause strong excitation. The velocity of the (0,2) mode is only slightly slower than that of the plane wave (0,1) mode so that the signal received is an addition of those two modes, unless a very long tube is used which allows the modes to separate. For a cylindrical duct the exact phase relationship of the two signals determines the magnitude of the received composite signal. The phase relationship depends on the diameter of the duct 4, the length of the duct (between the transducers 2,3), and on the plane wave velocity.

The velocity of sound, the plane wave velocity, is given by $$C = \sqrt{\frac{\gamma P}{\rho_o}} \quad (1)$$

where $\gamma$ is the ratio of specific heats, P is the pressure and $\rho_o$ is the density of the gas. Thus the velocity will depend on the nature of the gas and, for a particular gas at a fixed pressure and an absolute temperature T, the velocity will be given in terms of the velocity at some standard temperature, in this case 273K, by $$C = C_{273}\sqrt{\frac{T}{273}} \quad (2)$$

A change in the value of C alters the phase relationship and can alter the magnitude of the composite signal considerably. This amplitude can also be influenced by a converging flow.

Figure 3:
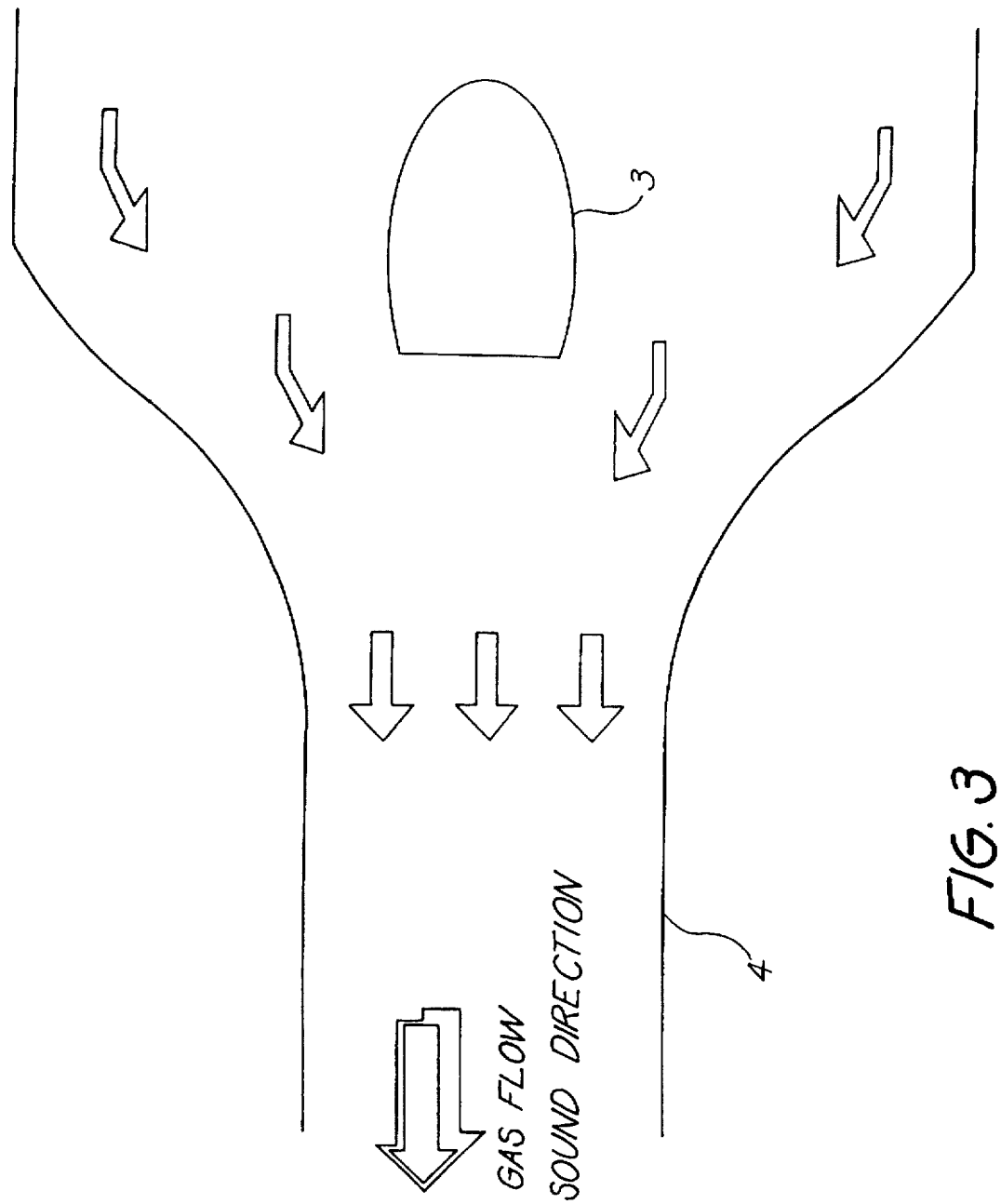
FIG. 3 illustrates a converging flow and the (0,2) modes.
Figure 4:
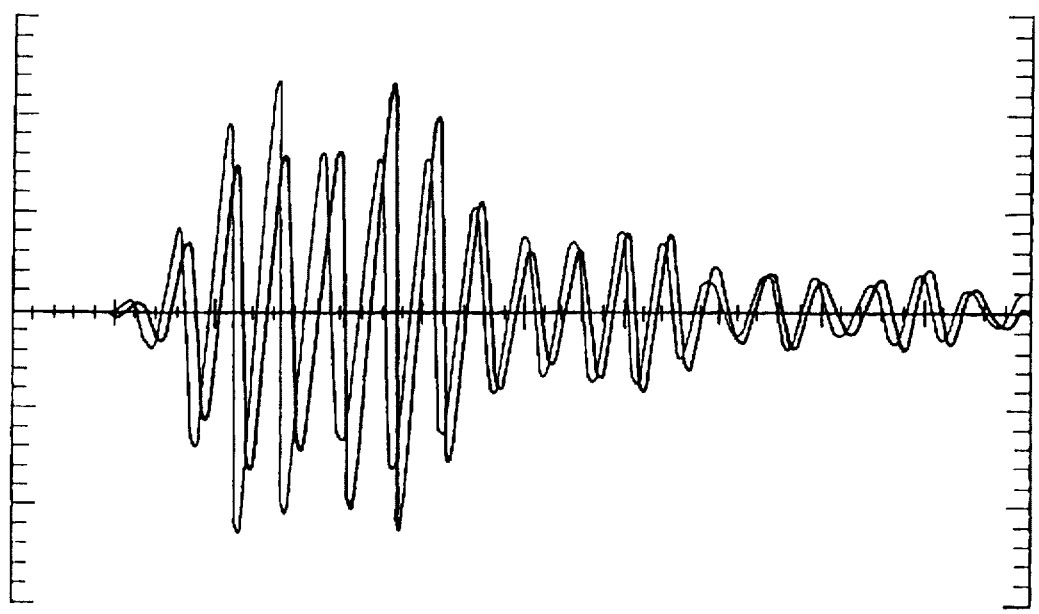
FIG. 4 shows the received waveform of FIG. 3.

Similarly, transmission into a converging flow is shown in FIG. 3. The waveform received in such a situation is shown in FIG. 4 where it will be seen that the second maximum in the envelope is larger than the first. One possible explanation for this is that the converging velocity field bends the sound from the transducer 3 which would otherwise be lost into a region on the perimeter of the smaller diameter section. A similar effect can be seen with hot gas in a cold tube (to be discussed later). This makes the detection of a particular zero-crossing substantially more difficult.

Figure 5:
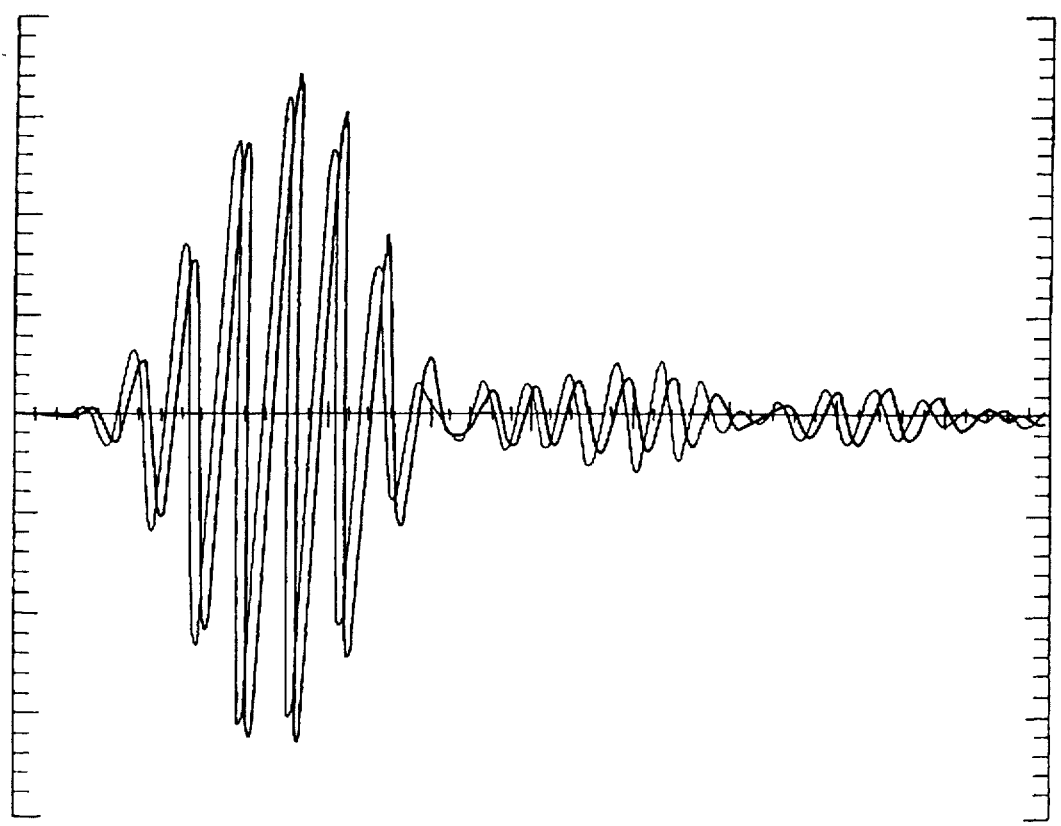
FIG. 5 is a view similar to FIG. 4 but after application of one embodiment of the invention.
Figure 6:
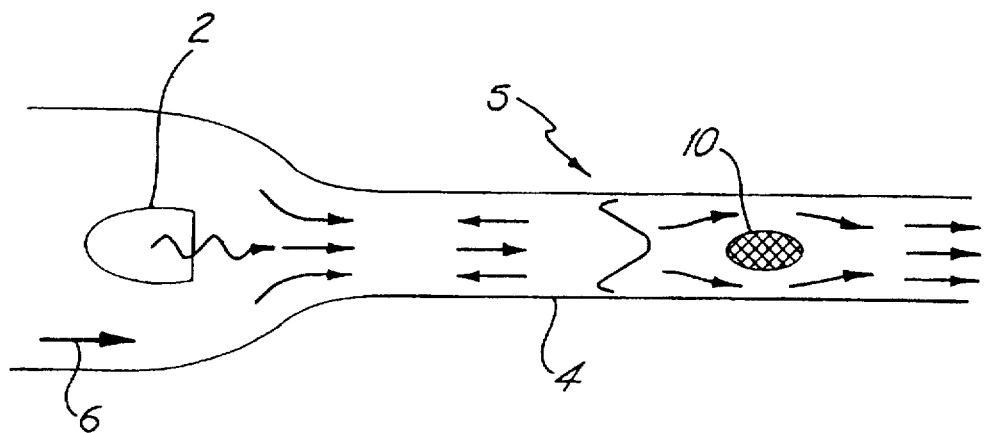
FIG. 6 depicts a single obstruction embodiment used in FIG. 5.

Turning now to FIG. 6, if a central obstruction 10 is placed in the duct 4, then the central part of the (0,2) mode, represented by reference numeral 5, and other more complicated modes which have a central component, are prevented from propagating. In such a case, the duct 4 about the obstruction 10 has an annular cross-section, which in view of the aerodynamic shape of the obstructions 10, varies along its length. The effect of this can be seen in FIGS. 4 and 5 that show the signal received through a duct 4 before and after the addition of a central obstruction 10 respectively. FIG. 4 shows two waveforms, one at zero flow in which the (0,2) mode is about two thirds the amplitude of the plane wave mode, and one for downstream flow in which the ratio of the amplitudes is reversed. In FIG. 5, which has the central obstruction 10, the size of the (0,2) mode is much reduced and the waveforms for zero flow and downstream flow are very similar.

The placement of the central obstruction 10 is not critical, but it has been found that a position about four or five diameters of the duct 4 and in from the entrance of the duct 4, as indicated in FIG. 6, gives the best results. The shape of the obstruction is governed by aerodynamic reasons and a sphere or tear drop is suitable. The optimal diameter of the obstruction 10 is about one half the diameter of the duct 4, but again this is not a critical dimension.

Figure 7:
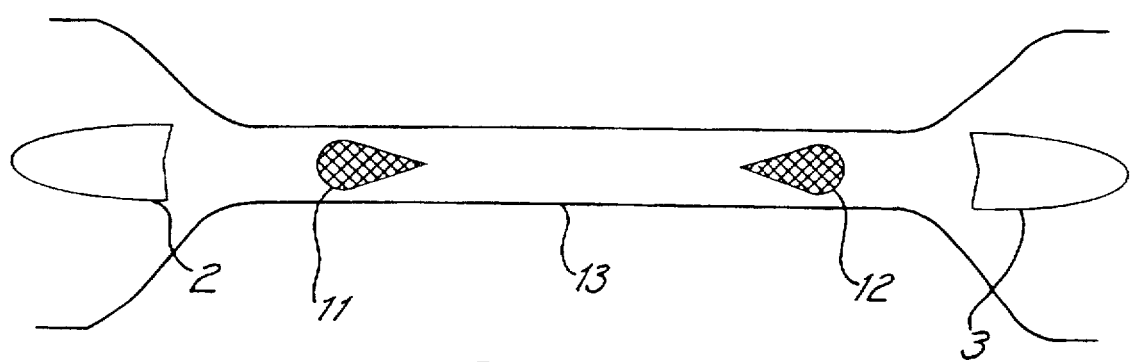
FIG. 7 shows an alternative embodiment which includes two obstructions.
Figure 8:
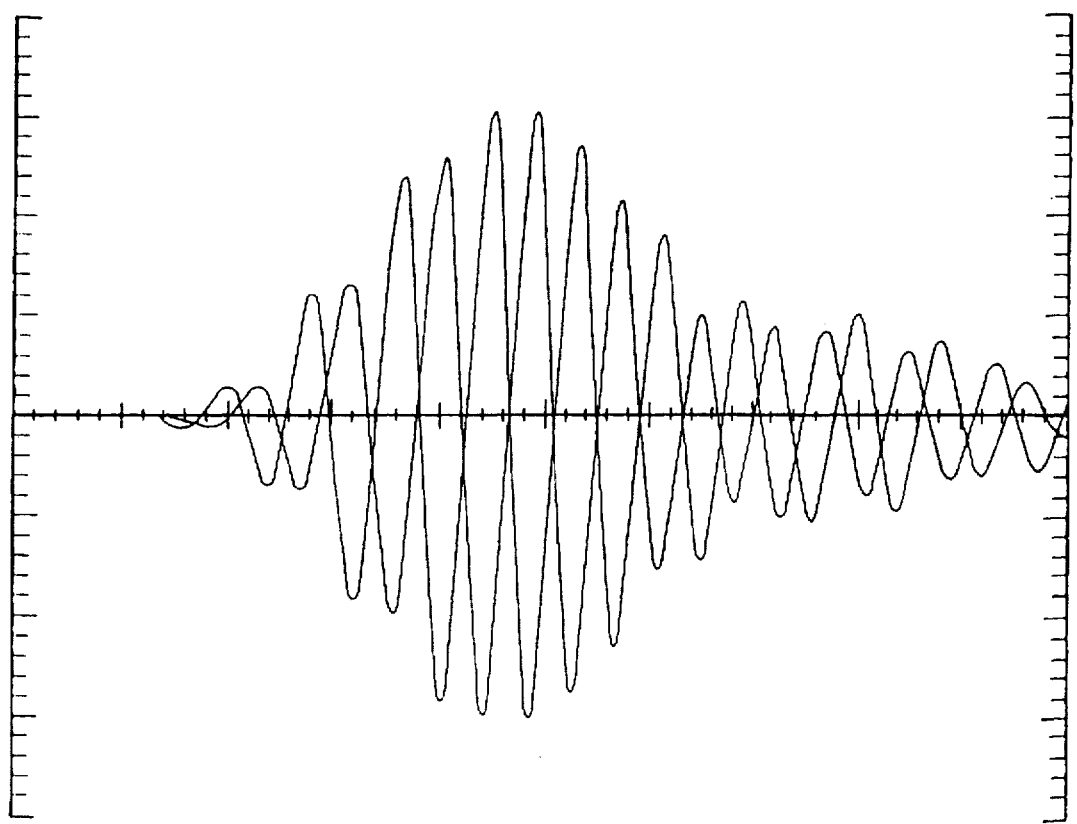
FIG. 8 shows waveforms resulting from the embodiment of FIG. 7.
Figures 9A, 9B:
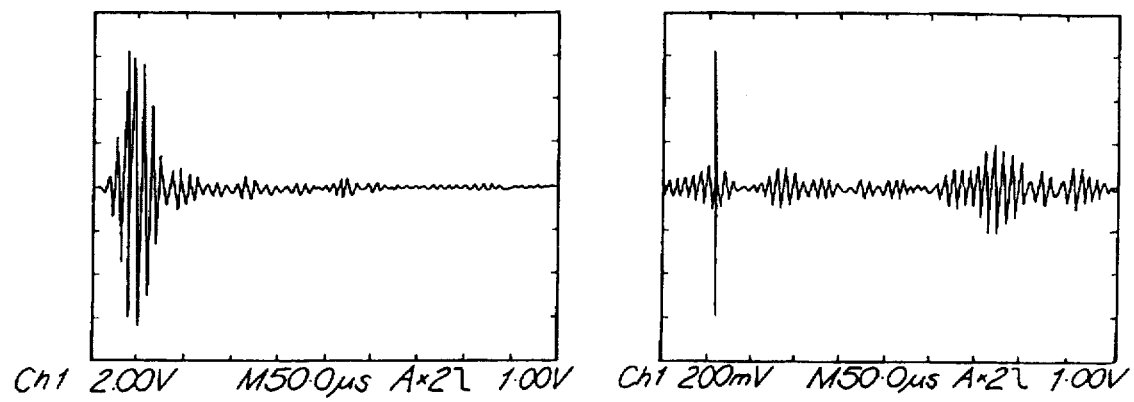
FIGS. 9A–9D are views similar to FIGS. 1A to 1D but of a tube incorporating an obstruction such as that of FIG. 6 or FIG. 7.
Figures 9C, 9D:
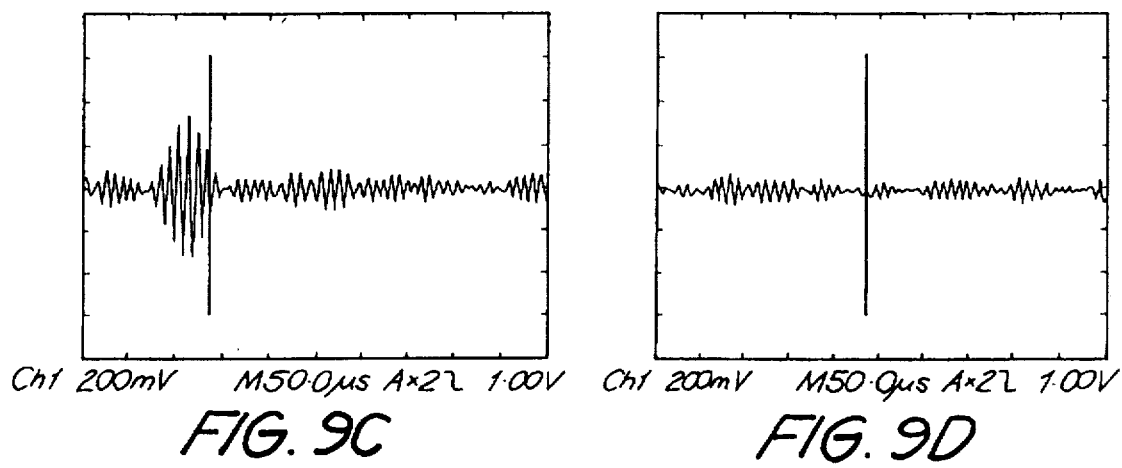

More than one obstruction 10 can be used to some additional benefit. FIG. 7 shows a duct 13 with two tear drop shaped obstructions 11 and 12. The duct 13 is insensitive to the direction of the flow and to the nature of the gas as regards the initial waveform. An example of the received signal in the cases of a downstream flow of air (as for FIG. 4) and a zero flow of natural gas is shown in FIG. 8. The wave shape for other combinations of gas type and flow also produce little change in the received waveform.

FIGS. 9A–9D show the higher modes for a cylindrical tube fitted with a central obstruction 10 as in FIG. 6. The amplitude of the higher modes has been diminished and of course the behaviour of the (0,2) mode has been controlled.

Figure 10:
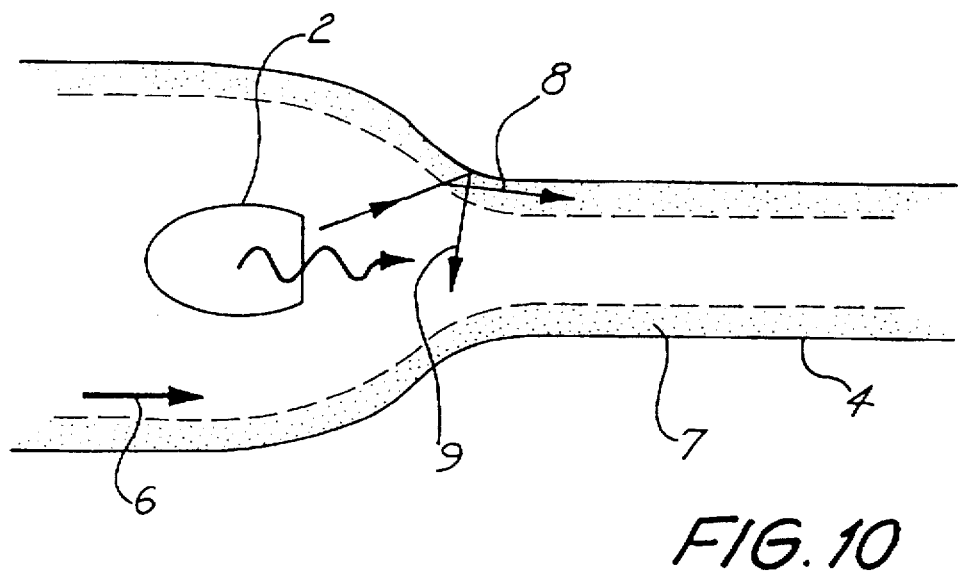
FIG. 10 shows the effects of temperature variations of the gas tube.

When the temperature of the meter body is very much less than that of the gas either because the meter body is very cold, or the meter body is at room temperature and the gas is very hot, then the (0,2) mode can be excited more than normal. A reason for this is illustrated in FIG. 10. Here, a hot gas flow 6 contacts the cold wall of the duct 4 to produce a cold layer of gas 7. Energy which would normally be reflected out of the duct 4 and hence, in a sense wasted, as is depicted by the arrow 9, is able to enter the duct 4 because it is refracted by the layer of cold gas 7 as depicted by the arrow 8. From equation 2 above, the velocity of sound in a gas is less if the gas is cold than if the gas is hot. A beam of sound entering a region of cold gas is bent as shown in the FIG. 10, in much the same way as a beam of light is refracted in an optically dense medium. The effect on the received signal can be seen in FIGS. 11A and 11B for a hot gas flowing in a cold duct.

Figure 11A:
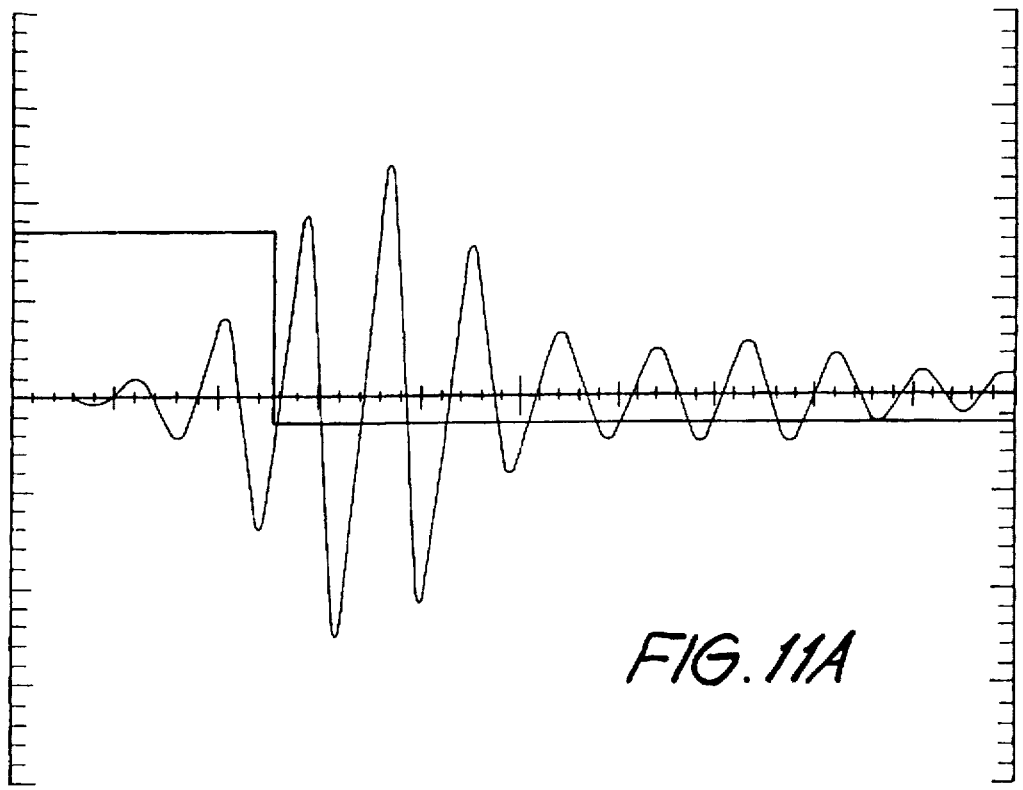
FIGS. 11A and 11B show signals transmitted in the tube of FIG. 10.
Figure 11B:
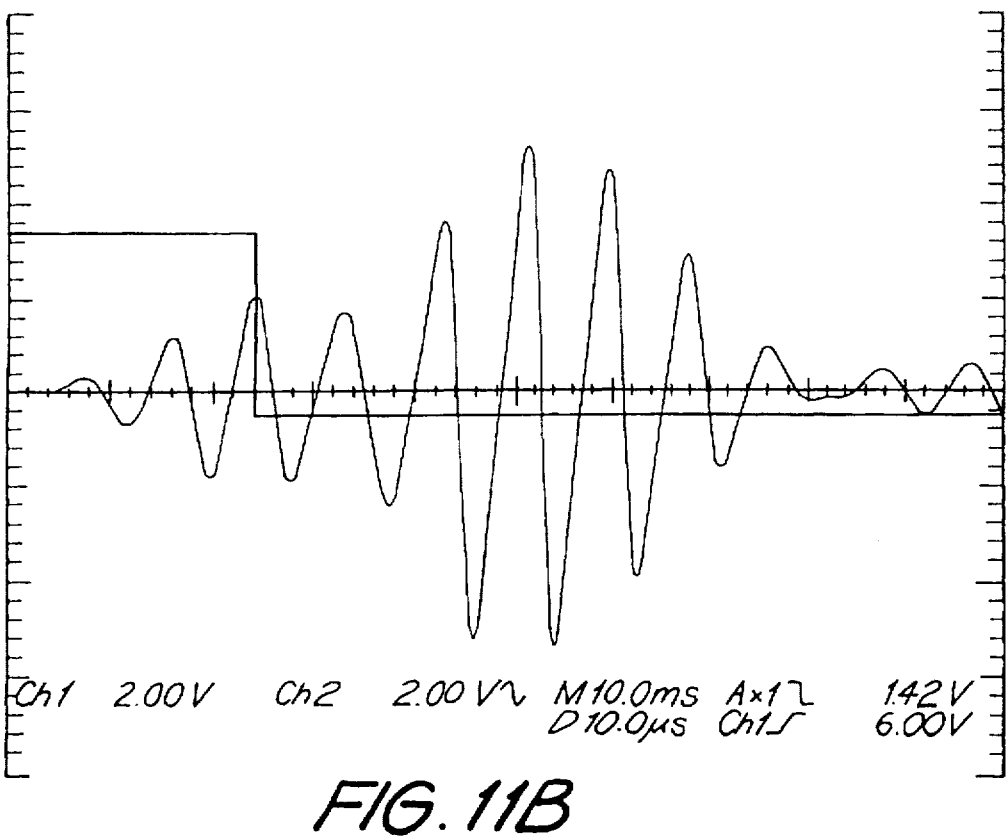

FIG. 11A represents an upstream transmission and FIG. 11B a downstream transmission. Compared with waveforms for zero flow at a uniform temperature, the (0,2) mode has been decreased in FIG. 11A and increased in FIG. 11B.

Figure 12:
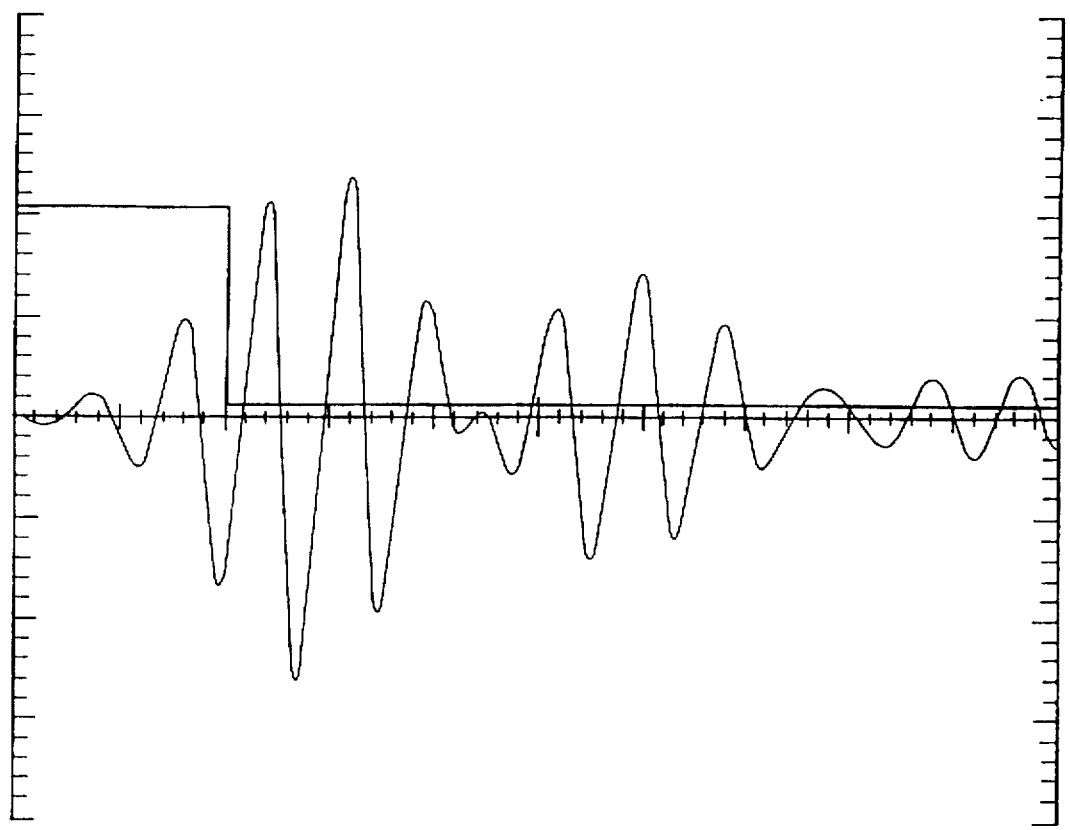
FIG. 12 illustrates the improvement over FIG. 11 using another embodiment of the invention.

Given that the above explanation is generally correct, the effect can be reduced by removing the layer of cold gas 7 at the meter wall. This can be performed using a gas stirring device which is fitted to the inlet of the inlet of the duct 4 to impart into the stream of gas, a swirling motion to induce mixing at the wall. The effect of this device can be seen by comparing FIGS. 11B and 12. In FIG. 12 the stirring device was used but otherwise the experimental arrangement was identical with that of FIG. 11B. The reduction of the (0,2) mode is clear.

Figure 13A:
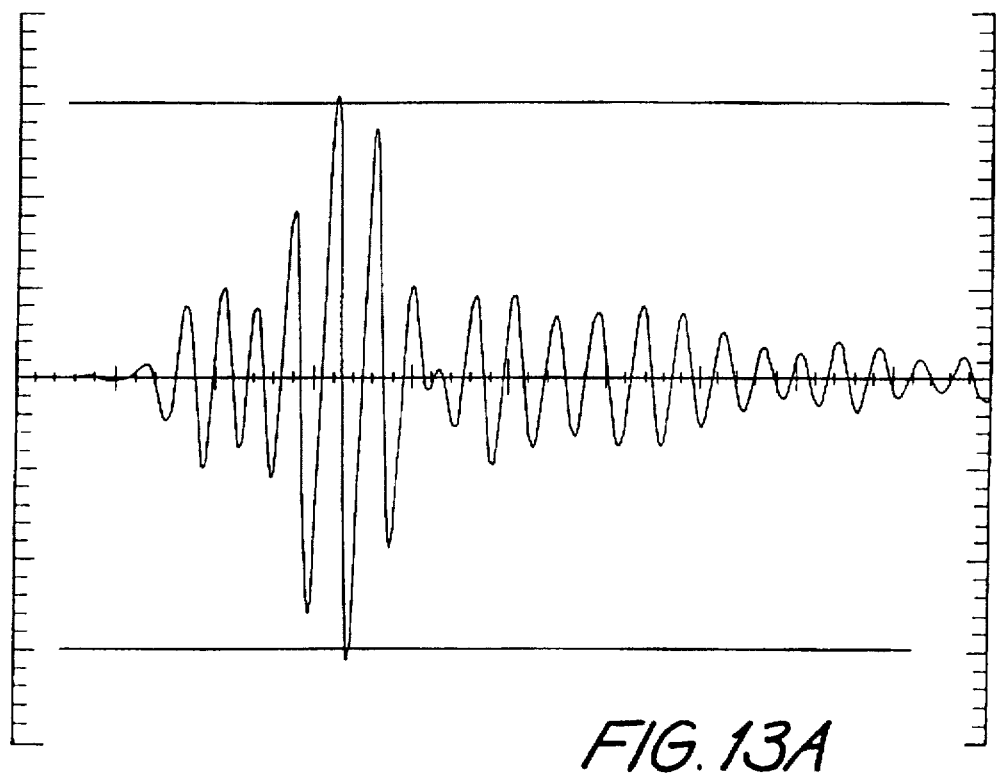
FIGS. 13A and 13B compare waveforms for temperature variation with and without an obstruction.
Figure 13B:
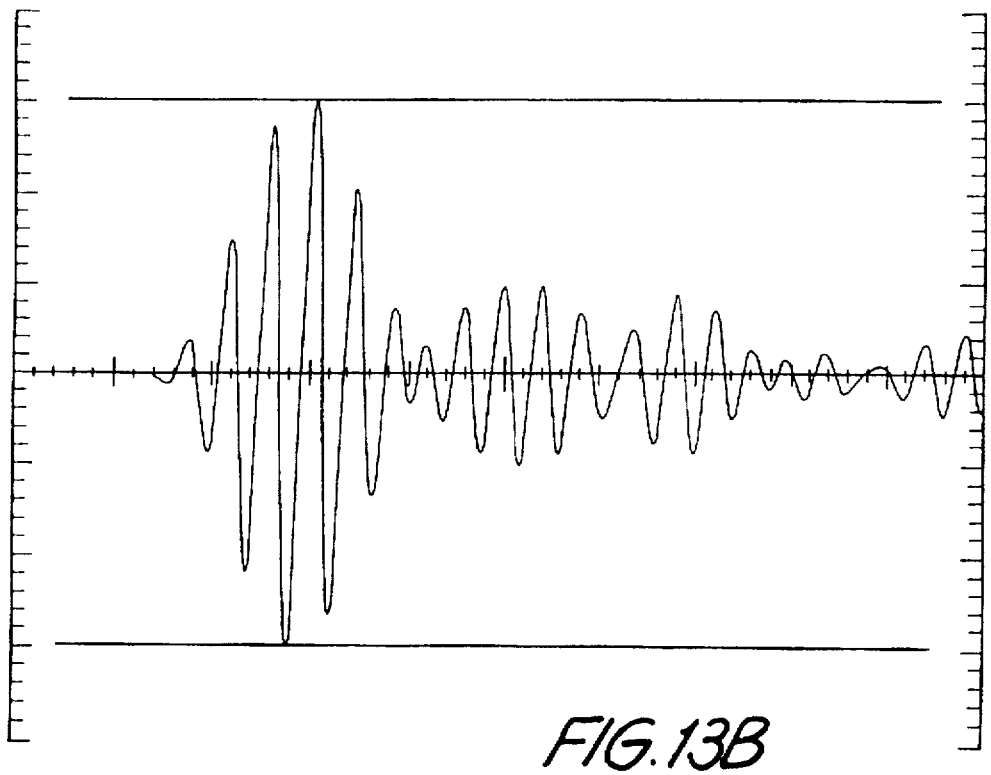
Figure 14:
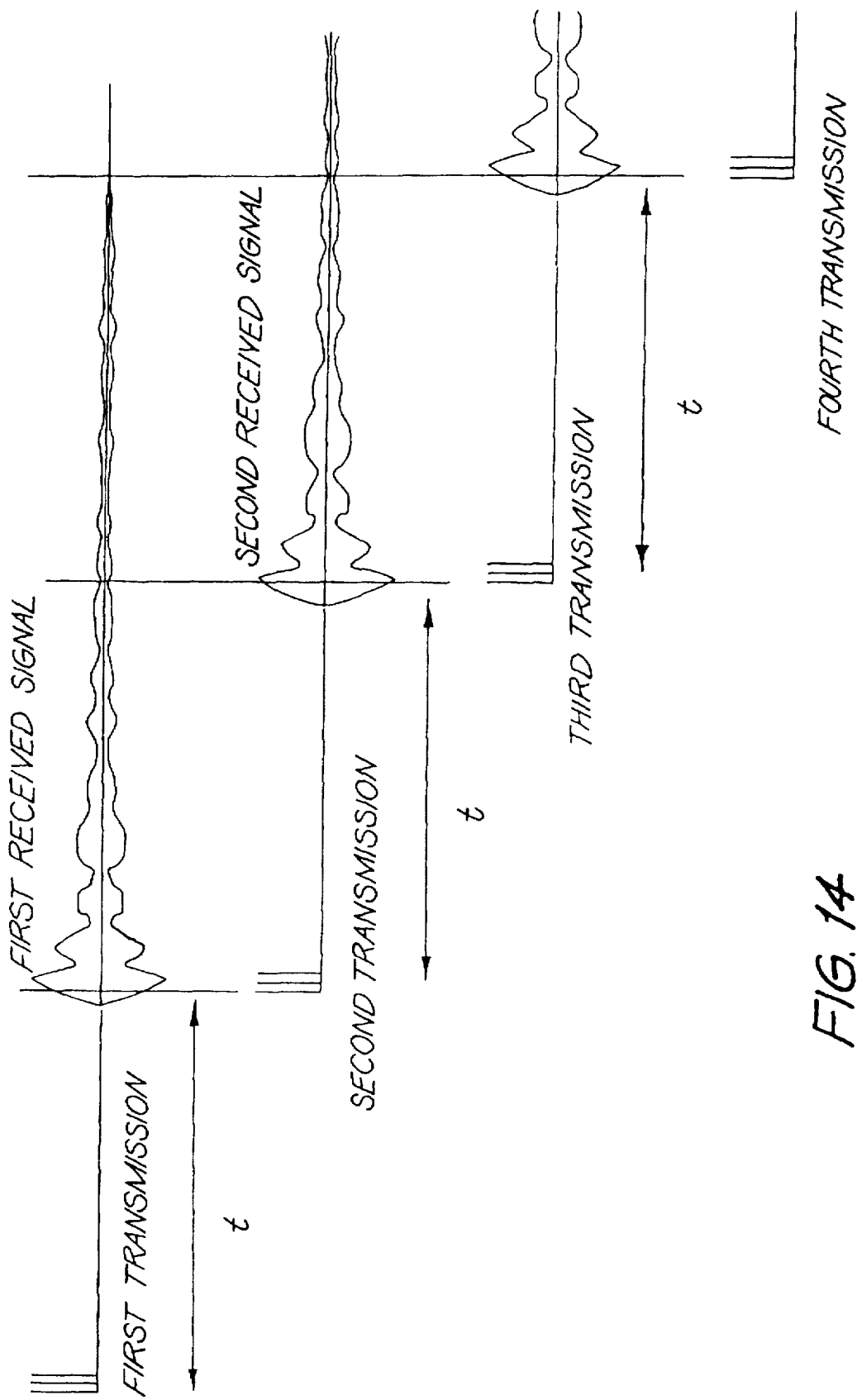
FIG. 14 depicts the transmission of ultrasound using the ring-around technique.
Figure 16A:
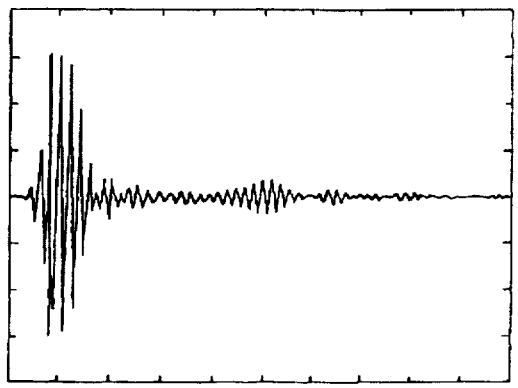
FIGS. 16A–16D are views similar to FIGS. 1A to 1D but resulting from the combination of FIGS. 6 and 15A.
Figure 16B:
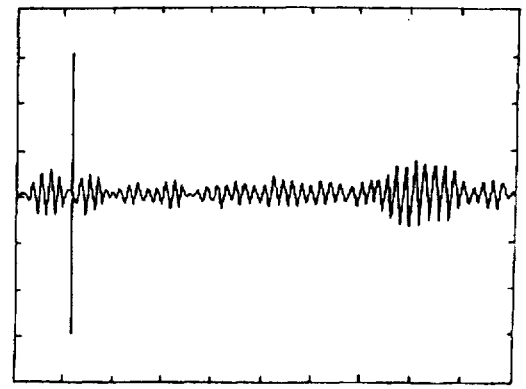
Figure 16C:
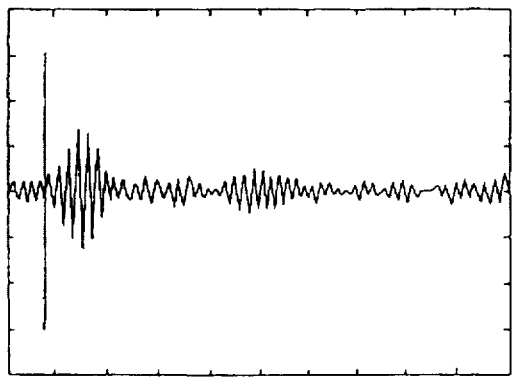
Figure 16D:
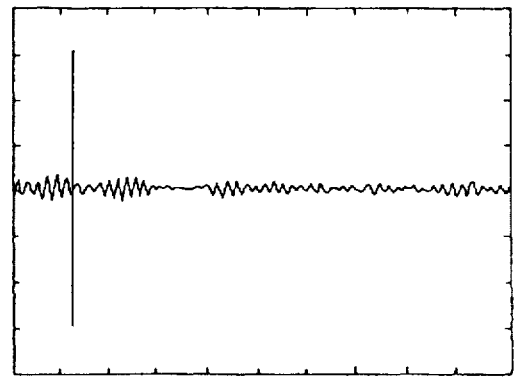

A central obstruction is very effective in supression of the (0,2) mode from this source. This is illustrated in FIGS. 13A and 13B where FIG. 13A is for a tube without a central obstruction. The duct has room temperature gas flowing through it and the walls have been cooled with a refrigerant. The accentuation of the (0,2) mode is again apparent. FIG. 13B is for the same conditions except that a central obstruction has been fitted. The waveform is now normal in the sense that it very closely resembles the waveform for the same duct at room temperature (FIG. 5).

Though the discussion has so far been concerned with the (0,2) mode there are very many other modes. These are generally of smaller amplitude than the (0,2) mode but in certain circumstances they can cause difficulties by corrupting the propagation of the main acoustic wave packet. This is particularly so in the use of the ring-around technique, described in detail in the aforementioned International Patent Application No. PCT/AU92/00314.

In this technique, when a signal is detected, a new pulse is immediately transmitted. Because of the very long tail of higher order modes on the signal, this retransmission arrives at the receiver while the previous signal still has a significant amplitude. In effect, there is a layering of signals with contributions from the higher modes of a number of previously transmitted pulses. These higher modes will add to the plane wave mode and produce a resultant which is the signal upon which the timing of the next transmission is based.

The first part of the first received signal will be free of all other modes; the second received signal will contain the plane wave mode from the second transmission and those modes which travel at one half the speed of the plane wave, i.e. c/2, from the first transmission. The third received signal will be the sum of the plane wave from the third transmission, modes with velocity c/2 from the second transmission and those with velocity c/3 from the first transmission. The extension to the fourth, fifth and so on received pulses will be apparent to the skilled addressee. This addition process is illustrated in FIG. 12. Furthermore, with reference to FIG. 1, the amplitudes become small as the mode order becomes high so that there is little effect on the received signal from modes of velocity less than c/4.

It can be shown theoretically or seen experimentally that the effect of flow on the received signal is to move the received signal as a whole along the time axis so that its shape is, in the main, preserved. The arrival time of the particular zero-crossing that has been chosen as the timing marker will vary with the flow. The arrival time will be longer or shorter depending on whether the transmission of the signal is upstream or downstream. The particular parts of the long tail of the received signal that add in the layering process described above will be those parts of the tail that are integral multiples of this time after the selected zero-crossing. The exact combination will thus vary with the flow.

This addition of other (high order) modes, whose phases vary with flow, to the plane wave, in the ring-around technique alters the time of the zero-crossing from that for the plane wave alone, that is, from that that would apply for a single transmission. When flows are calculated from transit times derived from the ring-around process the high order modes cause a periodic deviation from a straight line response as the flow varies over the range from no flow to maximum. This problem has been addressed by the transmission of an inverted pulse once in four transmissions as described in International Patent Application No. PCT/AU92/00315 (WO 93/00570) entitled "Mode Suppression in Fluid Flow Measurements" by the same Applicants.

However, this does not prevent the amplitude of the received signal from changing. When an inverted pulse is transmitted, the signal from higher modes which previously had been adding to the amplitude of the plane wave signal, will be subtracted from the plane wave. Thus the detection system must be able to detect reliably the correct zero-crossing when the amplitudes of the early peaks in the received signal are altered by amounts corresponding to those higher modes. It is therefore generally easier for the detection circuit to operate effectively if the magnitude of the higher modes, with velocities approximately c/2, c/3, and so on, are as small as possible.

Through examination of the nature of the modes as shown in FIG. 2, they are all seen to possess a high degree of symmetry based on the circular cross-section of the metering tube. Thus, in order to minimise the high order modes, it was observed necessary to break or change the symmetry of the geometry of the tube as much as possible.

FIGS. 15A and 15B show two cross-sections of metering ducts that represent a compromise between the above criteria. FIG. 15A shows a cross-section of a duct 20 which include a substantially semi-circular curved portion 21 and two flat faces 22 and 23. FIG. 15B shows a duct 25 having a part elliptical curved portion 26 and a single flat face 27. The ducts 20 and 25 operate on the principle that high order modes tend to be reflected from the wall of the duct and in each case, modes reflected off the flat faces 22 and 23, or 27 are reflected onto, and dissipated on the curved faces 21 and 26 respectively which, in view of the greater circumferential length (and their surface area), reduce the sound pressure level and hence amplitude of the high order modes.

FIGS. 16A–16D show the deformed cross-section duct 20 mentioned above, which has been fitted with a single central obstruction in the form of a tear drop. The downstream behaviour is now greatly improved. The use of central obstructions reduces the amplitudes of some of the higher modes as well as that of the (0,2) mode. The use of the two techniques together, non-cylindrical forms and central obstructions, gives an improved performance as regards the higher modes.

In a further configuration, the walls of the measuring tube 4 are roughened using grooves and/or bumps which are comparable in size to half the wavelength of the acoustic signal, generally between 0.01 and 8 millimeters for the broader ultrasonic frequencies and preferably between about 0.25 and 2 millimeters for the frequencies able to be employed using the apparatus disclosed in the aforementioned International Patent Applications. Such a roughening was found sufficient to reduce the contribution of higher order acoustic modes whilst permitting the plane wave mode to dominate at all flows and temperatures, without appreciably increasing the frictional resistance to flow (the pressure drop) within the tube 4.

The appropriate roughened surface finish to achieve high order mode damping can be provided by casting from an appropriate mould or by configuring the tube wall with a helical groove of pitch approximating the acoustic half wave length.

The effect of a particular higher mode is reduced because the energy it contains is spread over a finite time. That is, if the mode is reflected off a perfectly cylindrical surface, all of the mode front arrives at the transducer simultaneously and its full effect is felt. Roughening or distorting the surface causes a proportion of the mode front to travel over a slightly longer distance thereby reducing the total instantaneous contribution. Excessive roughening of the tube surface although reducing the influence of high order modes, can significantly increase the pressure drop.

It will be apparent from the foregoing that the addition of the obstruction, changes of the duct cross-section from a regular shape, and/or roughening/grooving of the duct between the transducers, acts to decrease the speed of propagation of the high-order acoustic modes without decreasing the speed of propagation path of the fundamental mode.

One significant advantage of the mode suppression techniques described herein is that they allow an electronic gas meter incorporating at least one of the described arrangements, to be calibrated using air prior to insertion into a gas pipeline. With traditional, prior art arrangemets, this technique has lead to mis-calibration due to the modal response of ultrasound in a combustible gas, such as "natural gas", being different to that of air. In such situations, the different modal response results in a different time of detection of the received burst of ultrasound. With the modal reponse substantially reduced in accordance with the principles described herein, the detection times are consistent for gases.

The foregoing describes only a number of embodiments of the present invention and modifications, obvious to those skilled in the art can be made thereto without departing from the scope of the present invention.

I claim:

1. A fluid flow measurement system comprising a duct for carrying a fluid, the duct having two transducers spaced apart therein to define a fluid flow measurement portion therebetween, wherein the measurement portion is adapted to control effects of non-fundamental acoustic modes on a signal received by at least one of the transducers without substantially altering an effect of a fundamental acoustic mode on said signal; and wherein said measurement portion has at least one obstruction located in the duct whereby fluid in the duct can flow thereabout, the obstruction having a shape and being so located within the duct to control effects of the non-fundamental acoustic modes.

2. A system as claimed in claim 1 wherein the measurement portion is adapted to control effects of non-fundamental acoustic modes originating from one of said transducers on a signal received by the other of said transducers.

3. A system as claimed in claim 2 wherein said measurement portion is configured to control the propagation between said transducers of said non-fundamental acoustic modes, to thereby reduce their effect as received by said one transducer, said propagation being suppressed by decreasing the speed of said non-fundamental acoustic modes or by modifying their phase relationships.

4. A system as claimed in claim 3 wherein the speed of the fundamental acoustic mode is not decreased, and the effects of the non-fundamental acoustic modes is reduced by decreasing their net contribution upon a signal amplitude received by said one transducer.

5. A system as claimed in claim 1, wherein each said obstruction is positioned centrally within the duct.

6. A system as claimed in claim 1, wherein each said obstruction is fluid dynamically shaped to reduce a change in fluid pressure thereabout.

7. A fluid flow measurement system comprising a duct for carrying a fluid, the duct having two transducers spaced apart therein to define a fluid flow measurement portion therebetween, wherein the measurement portion is adapted to control effects of non-fundamental acoustic modes on a signal received by at least one of the transducers;

wherein said measurement portion has at least one obstruction located in the duct whereby fluid in the duct can flow thereabout, the obstruction having a shape and being so located within the duct to control effects of the non-fundamental acoustic modes;

wherein each said obstruction is fluid dynamically shaped to reduce a change in fluid pressure thereabout; and wherein each said obstruction has a substantially smooth surface within the measurement portion and is configured to substantially reduce fluid pressure drop within the measurement portion.

8. A system as claimed in claim 7, wherein said obstruction is selected from the group consisting of an ellipsoid, and an object formed from a cone and a hemisphere having its circular face joined to the base of said cone.

9. A fluid flow measurement system comprising a duct for carrying a fluid, the duct having two transducers spaced apart therein to define a fluid flow measurement portion therebetween, wherein the measurement portion is adapted to control effects of non-fundamental acoustic modes on a signal received by at least one of the transducers; and wherein at least a section of the measurement portion is shaped to have an augmented, non-circular cross-section configured to control effects of the non-fundamental acoustic modes.

10. A system as claimed in claim 9, wherein said duct at said section of said measurement portion has at least two interconnecting wall portions, at least one of the wall portions being curved, and at least one other wall portion being substantially non-curved.

11. A system as claimed in claim 10, wherein the curved wall portion(s) are selected from the group consisting of a partial ellipse, a partial circle, a parabola, a hyperbola, a cycloid, a hypocycloid, and an epicycloid, and the substantially non-curved wall portion(s) are straight.

12. A system as claimed in claim 11, wherein interconnections between the wall portions are integrally formed.

13. A system as claimed in claim 9, further comprising at least one obstruction located in said measurement portion whereby fluid in the duct can flow thereabout, the obstruction having a shape and being so located within the duct to control effects of the non-fundamental acoustic modes.

14. A system as claimed in claim 13, wherein at least one of said obstructions is located within said section of said measurement portion.

15. A system as claimed in claim 9 wherein said duct at said section has an interior surface that includes irregularities configured to suppress effects of said non-fundamental acoustic modes.

16. A system as claimed in claim 15 wherein said irregularities comprise grooves formed in, or a roughening of, said interior surface.

17. A fluid flow measurement system comprising a duct for carrying a fluid, the duct having two transducers spaced apart therein to define a fluid flow measurement portion therebetween, wherein the measurement portion is adapted to control effects of non-fundamental acoustic modes on a signal received by at least one of the transducers; and wherein the measurement portion comprises a cylindrical duct and at least one fluid dynamically shaped obstruction located centrally therein.

18. A system as claimed in claim 17, wherein said obstruction(s) is an ellipsoid and disposed between the transducers centrally in the duct along its principal axis, thereby resulting in the cross-section being annular about the obstruction and wherein the width of the flow passage between the duct walls and the obstruction varies along the obstruction.

19. A system as claimed in claim 17, wherein an inner surface of the duct forming the measurement portion is roughened, said roughened inner surface acting to control effects of non-fundamental acoustic modes received by at least one of the transducers.

20. A fluid flow measurement system comprising a duct for carrying a fluid, the duct having two transducers spaced apart therein to define a fluid flow measurement portion therebetween wherein the measurement portion is adapted to control effects of non-fundamental acoustic modes on a signal received by at least one of the transducers; and wherein the measurement portion has a shape which is non-circular in cross-section in combination with at least one fluid dynamically shaped obstruction disposed in the measurement portion, the combination being adapted to control effects of non-fundamental acoustic modes received by at least one of the transducers.

* * * * *